(No Model.) 2 Sheets—Sheet 1.

D. S. GEISER.
THRESHING CYLINDER.

No. 563,661. Patented July 7, 1896.

WITNESSES:
H. T. Dieterich
Chas. E. Brock

INVENTOR
D. S. Geiser

BY
Fred G. Dieterich & Co
ATTORNEYS

THE NORRIS PETERS CO., PHOTO-LITHO., WASHINGTON, D. C.

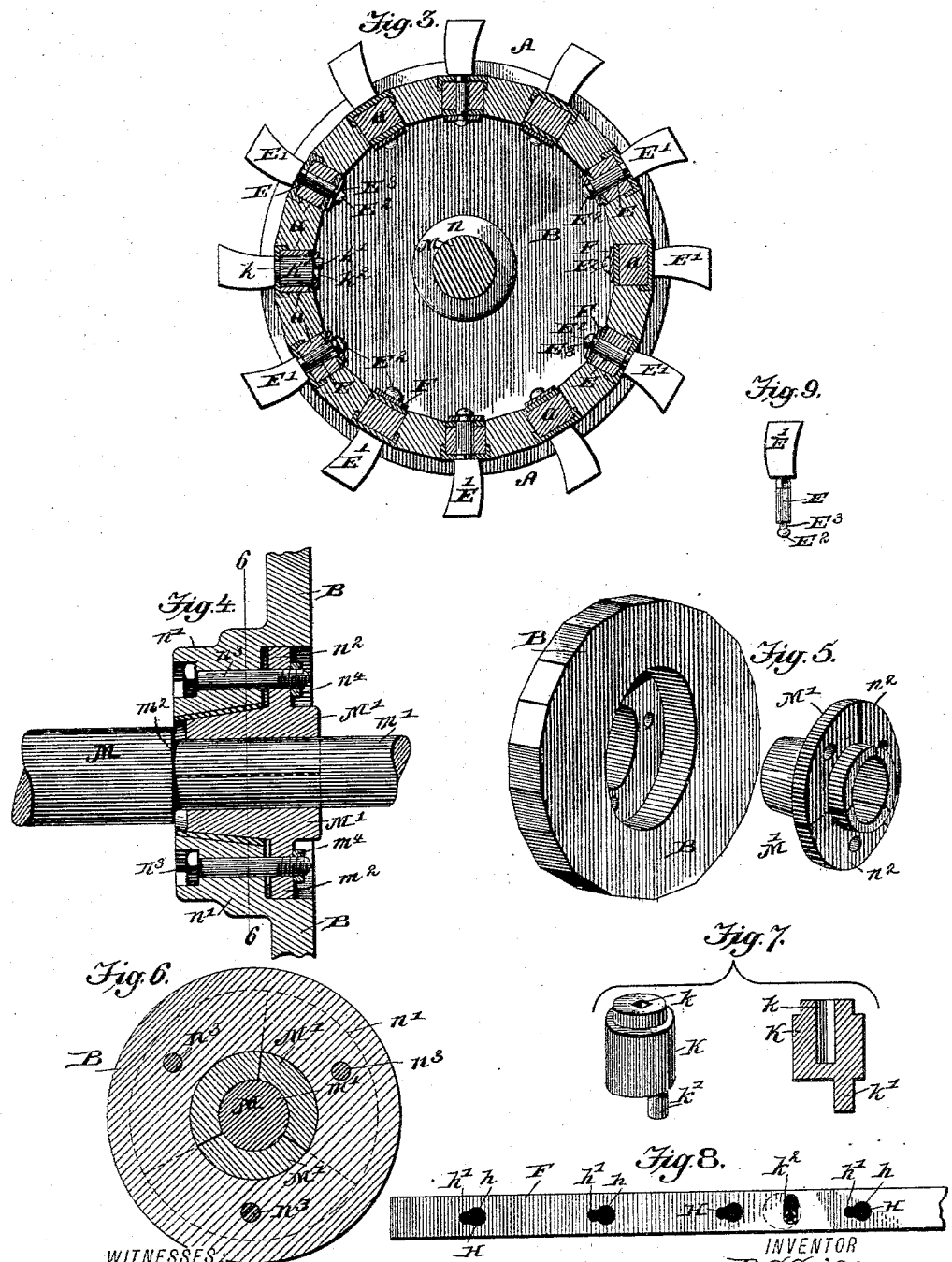

UNITED STATES PATENT OFFICE.

DANIEL S. GEISER, OF WAYNESBOROUGH, PENNSYLVANIA.

THRESHING-CYLINDER.

SPECIFICATION forming part of Letters Patent No. 563,661, dated July 7, 1896.

Application filed March 25, 1896. Serial No. 584,868. (No model.)

*To all whom it may concern:*

Be it known that I, DANIEL S. GEISER, residing at Waynesborough, in the county of Franklin and State of Pennsylvania, have invented an Improved Thresher-Cylinder, of which the following is a specification.

This invention relates generally to threshing-machines, and particularly to the cylinder thereof, the object of the invention being to provide improved means for securing the teeth in the cylinder, and also to provide novel means for securing said cylinder upon the rotary shaft or journal.

Threshing-machine cylinders as usually constructed are composed of a series of bars in which the teeth are secured, and the most common method of securing said teeth is by threading the shank which passes through the bar and securing a nut upon said shank on the inside of the bar. This method, however, has been found unsafe, inasmuch as the nuts are liable to work loose on account of the successive jars to which the teeth are subjected. To avoid these objections certain contrivances have been invented, but, so far as I am aware, none of them have successfully accomplished the purposes for which they were intended.

Now the object of my invention is to provide an improved locking means for locking the entire series of teeth in each bar.

Another object of my invention is to provide a locking means which can be operated entirely from the exterior of the cylinder.

Another object of my invention is to provide a locking means which can be operated only when the cylinder is in a certain predetermined position.

Another object of the invention is to provide a cylinder and shaft of such constructions that the cylinder can be quickly and easily attached to said shaft in a perfectly rigid manner, thereby preventing all possibility of the cylinder slipping upon said shaft.

With these various objects in view my invention consists in the peculiar construction of the various parts, and in the novel manner of combining or arranging said parts, all of which will be fully described hereinafter, and pointed out in the claims.

Figure 1:
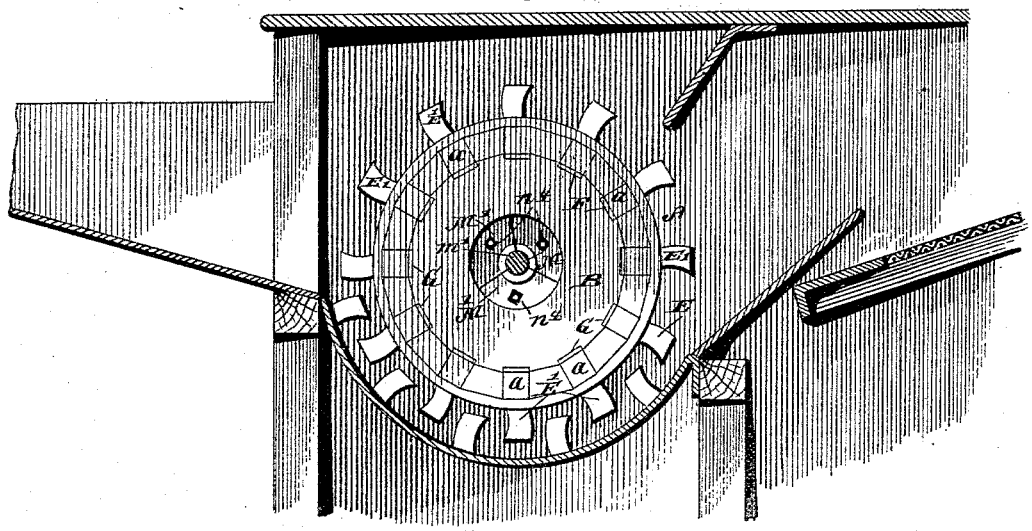
Figure 2:
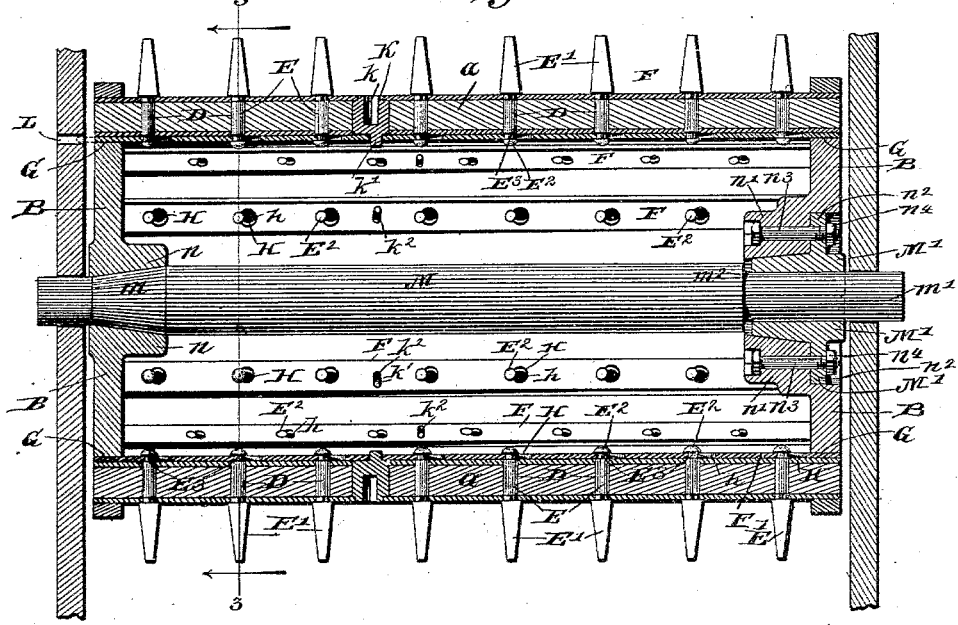

In the drawings forming a part of this specification, Figure 1 is an end view showing the improved cylinder arranged within a threshing-machine case. Fig. 2 is a vertical longitudinal sectional view showing the manner of locking the teeth in the cylinder. Fig. 3 is a transverse vertical section on the line 3 3 of Fig. 2, the locking-key being shown in elevation. Fig. 4 is a sectional view showing the manner of securing the split collar within the head of cylinder. Fig. 5 is a detail view of said parts separated. Fig. 6 is a sectional view on the line 6 6 of Fig. 4. Fig. 7 shows the key inside elevation and vertical section. Fig. 8 is a plan view of the locking plate or bar. Fig. 9 is a detail view of one of the teeth.

Inasmuch as my invention is applicable to any of the forms of thresher-cylinders now in use, I have shown my invention as applied to a closed cylinder A, composed of a series of bars $a$, arranged close together, thus virtually constituting a cylinder-shell. The other construction of cylinder now in common use consists of bars arranged a considerable distance apart from each other.

The bars $a$ are secured between heads B B of the cylinder, and this cylinder is mounted upon a rotary shaft M in a manner presently described. Each bar $a$ has a series of holes D produced therein, said holes being adapted to receive a shank E of the teeth E', and at the lower or inner ends of these shanks are produced heads $E^2$, and between the heads $E^2$ and shank E is a reduced neck portion $E^3$. Sliding upon the inner side of each bar $a$ is a locking plate or bar F, said plate sliding in guide-openings G, produced in each head of the cylinder, and this locking plate or bar F has a series of openings H, shaped after the pattern of a keyhole, the eye $h$ of said opening being of a size to receive the head on the end of shank, while the reduced portion $h'$ is of a width to snugly receive the reduced neck portion upon said shank. It will thus be seen that if the shanks of the teeth are placed in the perforations, the heads of said shanks will be passed through the opening in the locking plate or bar, it of course being understood that the eye of the opening in the plate is brought into register with the holes D made in the cylinder, and inasmuch as the locking plate or bar slides freely within the heads of the cylinder, it will be seen that said plate is always held in proper position against the under side of the cylinder-bar. After the shanks of the teeth have been passed through the cylinder and locking-plate, said plate is slid to one side, in the present instance to the left, thus forcing the reduced portion of the keyhole-slot into engagement with the shank and securely locking the teeth within the cylinder, and in order to so move said locking-plate I employ an eccentric-key K, which is mounted in the bar of the cylinder, and has a central opening $k$, into which the turning-bit is introduced, and the under side of said key is provided with a lug $k'$, arranged eccentric or to one side of the center, said lug engaging a transverse slot $k^2$, produced in the locking-plate H.

In the above construction it will be seen that by inserting a square bit or tool into the opening K and giving the key a turn, the eccentric-lug causes the locking-plate to slide in the desired direction, and in case the locking-plate is being forced to a locked position, the eccentric is carried around a slight way beyond a half turn, thus securely locking the eccentric-key within the cylinder-bar, thereby preventing any possible rotation of said key and unlocking of the locking plate or bar.

As the locking-plate slides within the guide-opening of the cylinder-heads, it is obvious that said plate will always be held in the proper position whether any of the teeth are connected therewith or not, and by such an arrangement all of the teeth can be removed from the cylinder if so desired without misplacing the locking plates or bars, and so far as I am aware this cannot be done with any of the locking devices now in use.

One side of the case of the thresher has an opening L produced therein adjacent to the cylinder, said opening, in fact, being within the path of the locking-plate, so that by moving the cylinder so that the guide-opening G will register with the opening L the plate or bar can be unlocked by turning the key, such action of the key projecting the end of the locking plate or bar through the head of the cylinder and into the opening L in the side of the case, said opening being necessary to permit a sufficient movement of the locking plate or bar, and it will be noticed that after the end of the locking-plate has been projected into the opening L the cylinder is locked against rotation, so that any and all of the teeth can be removed and replaced if desired.

After one bar of locking-teeth has been attended to, the locking plate or bar is moved back to its locked position and the cylinder moved around to bring the next bar opposite the opening in the side of the case. By this arrangement it will be seen that the bars cannot possibly be unlocked except when brought opposite the opening in the side of case, and, furthermore, that when so unlocked the cylinder will be held against rotation until the locking plate or bar is relocked.

In order to securely mount the cylinder upon the rotating shaft M, I construct the end $m$ with a slight taper and reduce the end $m'$, producing a shoulder $m^2$. The end $m$ is forced through the hub $n$, which is made slightly tapering, while the end $m'$ passes through a split collar M', said collar being located in the hub $n'$ of the cylinder-head. The split collar M' is made in three sections and tapers slightly toward the interior, and is provided with suitable lugs $n^2$, through which pass the bolts $n^3$, projected through the hub of cylinder-shaft from the interior, and upon the threaded ends of said bolts are secured the nuts $n^4$, by means of which the split collar is drawn into the hub of cylinder-head and forced against the shoulder $m^2$, thereby clasping it firmly and forcing the tapered end $m$ into the hub $n$ of the opposite head.

The tapered end can be dispensed with if desired, and a suitable spline or key used upon the shaft, or said spline or key can be used upon the tapered end if so desired.

In the construction just described it is obvious that in order to tightly connect the cylinder and shaft it is only necessary to make the attachment at one end, which operation can be quickly and easily accomplished.

The operation and advantages of the various parts of my invention have been fully set forth in the description of said parts, and further recital of said operation and advantages is not necessary here.

Having thus described my invention, what I claim as new, and desire to secure by Letters Patent, is—

1. The combination with the cylinder, having openings of the teeth having headed shanks, and the locking plate or bar having keyhole-slots, and working in guide-holes in the heads of cylinder, substantially as shown and described.

2. The combination with the cylinder having openings, of the teeth having headed shanks, the locking plate or bar having keyhole-slots, and an eccentric-key mounted in the cylinder to slide and lock the said plate or bar, substantially as shown and described.

3. The combination with the cylinder having openings, of the teeth having headed shanks, the locking plate having keyhole-slots, and the eccentric-key for moving said plate, substantially as shown and described.

4. The combination with the cylinder having openings, of the teeth having headed shanks, the locking-plate having keyhole-slots and also a transverse slot, the eccentric-key having a lug engaging said locking-plate, substantially as shown and described.

5. The combination with the cylinder, having openings in the shell and guide-openings in the heads, of the teeth having headed shanks, the locking-plate having a series of keyhole-slots and a single transverse slot, the locking-key having an eccentric-lug adapted to engage the transverse slot, substantially as shown and described.

6. The combination with the thresher-case having an opening in the side, of the cylinder having an opening in the head, the teeth and locking-plate and means for sliding said plate through the openings in the head and case, substantially as shown and described.

7. The combination with the thresher-case, having an opening in the side, of the cylinder having an opening in the head, the teeth having headed shanks, the locking-plate having a series of keyhole-slots, and a single transverse slot, and the locking-key having an eccentric-lug, all arranged substantially as shown and described.

8. The combination with the cylinder having heads, of the shaft having a shoulder near one end, the split collar arranged about said end, and within the head, and means for drawing the collar into the head and pressing it upon the shaft, substantially as shown and described.

9. The combination with the cylinder having heads, of the shaft tapered at one end, and having a shoulder at the other end, the split collar having lugs, and the bolts for connecting the collar-sections and its head, substantially as shown and described.

10. The combination with the cylinder and teeth, of the slotted plate and key for moving and locking said plate, substantially as shown and described.

DANIEL S. GEISER.

Witnesses:
J. F. GEISER,
A. B. STOLER.